United States Patent
Dorn et al.

(10) Patent No.: US 8,510,711 B2
(45) Date of Patent: Aug. 13, 2013

(54) CENTRAL STRATEGY MANAGEMENT COMPONENT FOR PROVIDING SEMANTIC-FREE ADMINISTRATION FUNCTIONS FOR A SYSTEM OF APPLICATIONS

(75) Inventors: Karlheinz Dorn, Kalchreuth (DE); Andreas Schülke, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 1662 days.

(21) Appl. No.: 11/802,984

(22) Filed: May 29, 2007

(65) Prior Publication Data
US 2007/0283320 A1 Dec. 6, 2007

(30) Foreign Application Priority Data
May 30, 2006 (DE) .......................... 10 2006 025 111

(51) Int. Cl.
*G06F 9/44* (2006.01)
(52) U.S. Cl.
USPC ........................................ 717/120; 717/121
(58) Field of Classification Search
USPC ................................................. 717/120, 121
See application file for complete search history.

(56) References Cited

U.S. PATENT DOCUMENTS 6,115,646 A * 9/2000 Fiszman et al. ............... 700/181
7,660,785 B1 * 2/2010 Ladha et al. ........... 707/999.003
2006/0059253 A1 * 3/2006 Goodman et al. ............ 709/223

OTHER PUBLICATIONS

Goal, A. and Okumoto, K., Time-Dependent Error-Detection Rate Model for Software Reliability and Other Performance Measures, IEEE 1979, 6 pages.*

* cited by examiner

*Primary Examiner* — Anna Deng
(74) *Attorney, Agent, or Firm* — Harness, Dickey & Pierce

(57) ABSTRACT

A strategy mechanism is disclosed, including at least one business program component and a strategy management component which, as a single executable program object, makes a plurality of at least two administration functions available to the at least one business program component. In at least one embodiment, the program code for implementing the administration functions is realized in the strategy management component in such a way that the at least one business program component itself need not contain any program code for realizing the administration functions. Further, the program code in the strategy management component is generically realized such that all business program components running in the software system can use the administration functions.

18 Claims, 1 Drawing Sheet

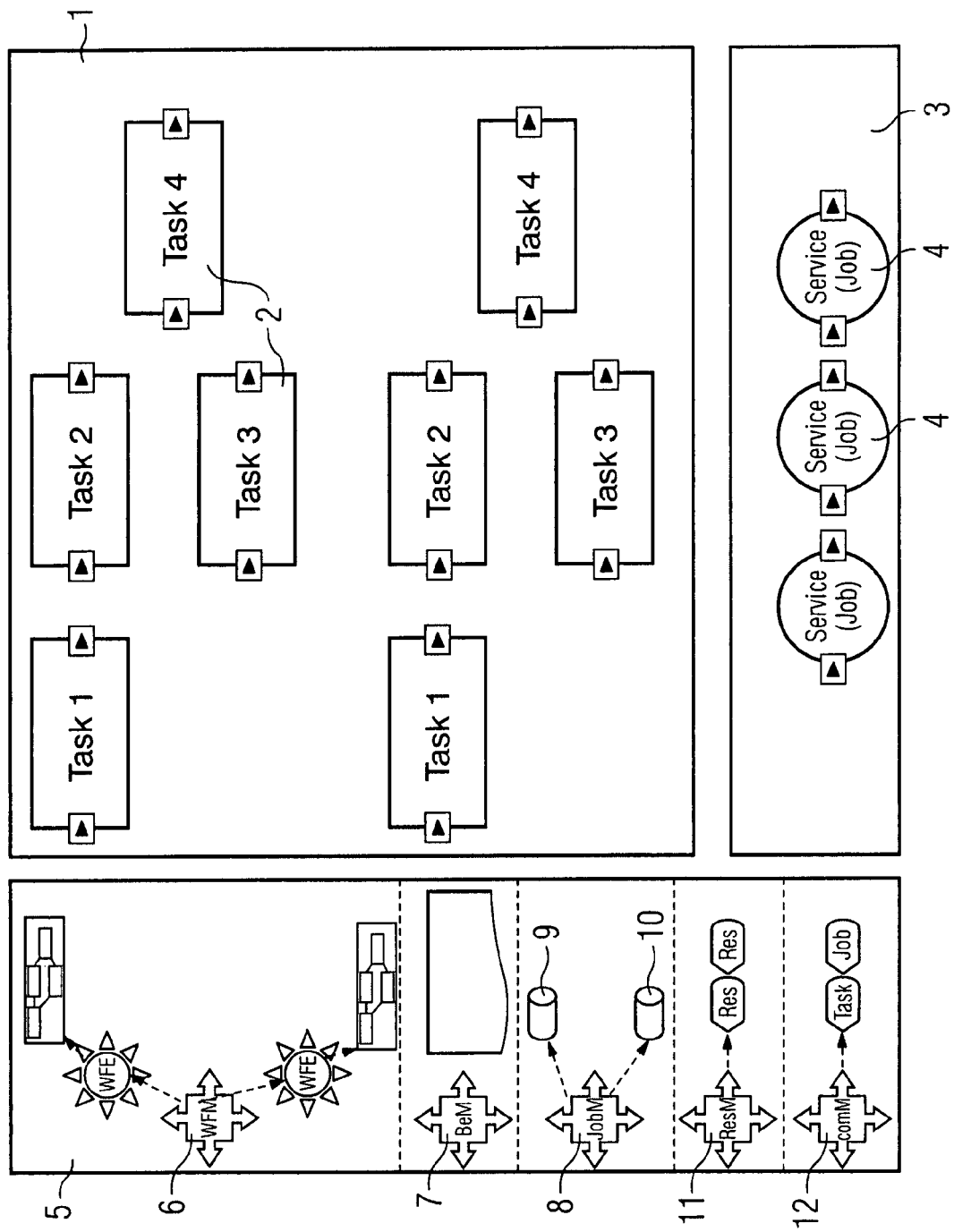

CENTRAL STRATEGY MANAGEMENT COMPONENT FOR PROVIDING SEMANTIC-FREE ADMINISTRATION FUNCTIONS FOR A SYSTEM OF APPLICATIONS

PRIORITY STATEMENT

The present application hereby claims priority under 35 U.S.C. §119 on German patent application number DE 10 2006 025 111.3 filed May 30, 2006, the entire contents of which is hereby incorporated herein by reference.

FIELD

Embodiments of the invention generally relate to the management of program components; for example, to a centralized management of various administration aspects of program components.

BACKGROUND

In complex program systems according to the prior art, functions for accessing other components are generally implemented by way of extensive special program codes within the individual program objects. This is the case, for example, when specific program objects access background jobs which are expected to service specific tasks for these program objects. The code for addressing and administrating the job program objects, which then run in the background, is implemented in the calling program objects, while each individual instance of the job program objects has a dedicated queue for buffering information which must be processed.

Other functionalities, such as e.g. the monitoring of a desired maximal number of concurrently active instances of a program object (e.g. in order to ensure that the computer on which the programs run is not overloaded by too many instances of the program object and consequently impaired in terms of its responsiveness), also take place in the program object itself by way of suitable counting mechanisms, etc. As a result of all this, the individual program objects of a system are overloaded with administration codes which, being specifically adapted to the individual program objects in most cases, are moreover not replicable and therefore also increase the number of possible error sources within the overall system as a result of continuous reprogramming.

SUMMARY

In at least one embodiment, the present invention therefore addresses the problem of setting forth a way by which it is possible to simplify the interaction of so-called business program objects with various administration functions.

Further advantageous embodiments, aspects and details are derived from the dependent claims, the description and the appended drawings.

In at least one embodiment, the problem is improved upon or even solved by way of a semantic-free and central strategy mechanism for managing applications of a software system, comprising:
at least one business program component,
a strategy management component which, as a single executable program object, makes a plurality of at least two administration functions available to the at least one business program component,
wherein the program code which is necessary for implementing the administration functions is realized in the strategy management component in such a way that the at least one business program component itself need not contain any program code for realizing the administration functions and that the program code in the strategy management component is generically realized such that all business program components running in the application system can use the administration functions.

In the context of embodiments of the invention, the terms "strategy mechanism" and "mechanism" are understood to signify a product, a method and/or a system for providing such a mechanism. They therefore relate to a hardware-based apparatus and/or a software-based method which embodies the essential features according to embodiments of the invention.

In the context of at least one embodiment of the present invention, a business program component signifies an entity within the framework of an overall application which is designated as an application system and can include a plurality of individual so-called executables, wherein the business program component can implement any functionalities of the program.

The central core of at least one embodiment of the invention is the strategy management component, which may be a single executable program object according to at least one embodiment of the invention, and therefore the entire code is located within a single so-called "executable" which is handled accordingly on the level of the operating system. According to at least one embodiment of the invention, this strategy management component provides the business program components with at least two administration functions and preferably all necessary administration functions.

According to at least one embodiment of the invention, the strategy management component contains all of the necessary program code which is required for implementing the administration functions, thereby completely relieving the individual business program components of this task. During their development, the business program components can be programmed such that they only address the required functions of the strategy management component by means of a function call or object call. The strategy management component therefore contains standardized interfaces which must be known to the programmers of the business program components and which can be addressed by all business program components. This is therefore a generic strategy management component which is addressed in exactly the same manner by all business program components and whose program code deals with all anticipated scenarios with regard to its relevant administration functions.

It is preferable if the entire functionality for administration functions is transferred to the strategy management component, such that the business program components do not contain any program code which is required for supervision in relation to central service mechanisms.

The administration functions can be selected from job management, resource management, component management, business task management and taskflow management, but can also include further administration functions as required.

Job management is understood to mean the access to and interaction with job program objects which, in the background, carry out specific tasks for program objects, e.g. printing, network services, etc. In an example embodiment, the administration function is a job management in which a central queue is used for all business program components, and the job management is performed by the strategy management component in order to connect at least one back-end processing job to the program components. In this example embodiment of the invention, therefore, not only the pure administration function but also the queue function is exported, wherein said queue function was previously usually performed within the individual utility programs which processed the jobs, and therefore the business program components from the prior art also needed to have at their disposal administration functions for the queues. According to at least one embodiment of the present invention, the strategy management component also assumes responsibility for the queue administration.

Resource administration is understood to mean the monitoring of the available resources on a computer, particularly those for which instances of a specific program are already running, and possibly the restriction of the number of running instances in order to avoid overloading the computer. This resource management depends on the program component concerned, these require varying amounts of computing time, and on the computer on which the program component runs, since its resources are individual. In an example embodiment, one of the administration functions is the resource management, which is intended for centralized resource administration for the program components. The resource administration can preferably be intended for limiting the number of concurrently running instances of a business program component to a predetermined value, wherein this predetermined value can be stored in an external database or also in the program component itself or even in the strategy management component.

A further preferred integral administration function is the taskflow management, which is intended for starting up and shutting down taskflows or a number of business program components and for their runtime monitoring.

In a further embodiment, one administration function is the component management, which is intended for starting up and shutting down, suspending and resuming business program components and for their runtime monitoring.

The two aforementioned example embodiments together satisfy an important control function for the operation of the overall application system, since they govern the execution of the application system on two different levels.

In a further example embodiment, the strategy management component accesses a flexible communication layer for the communication between the strategy management component itself and the business program components. Such an intermediate communication layer represents an abstraction which increases the flexibility of use of the strategy management component in relation to the business program components. For example, implementing a use via a network or a use in multiprocessor machines is simpler if a flexible communication layer is utilized via which the business program components access the strategy management component instead of a direct access which must satisfy certain prerequisites that are subject to changes in variable environments, e.g. on laptops which can be used online and offline.

The strategy management component is preferably implemented such that an error frequency and/or the lack of errors in the strategy management component is a mathematically demonstrable variable because it is independent from the semantics of the business components and is not dependent on their error susceptibility since it is executed in a separate executable.

An important advantage of the strategy management component according to at least one embodiment of the invention is that the program code which is used for implementing the administration functions need only be written once and therefore can be carefully planned and tested. This supports the objective of carrying out methods for appropriate testing of the code in respect of its lack of errors, even in a complex environment and under time pressure, the methods being familiar to a person skilled in that art. Being able mathematically to demonstrate a lack of errors or error frequency crucially improves the software quality, and therefore the strategy management component can also be used as a very important aspect for improving the stability of the application system according to at least one embodiment of the invention.

The application system according to at least one embodiment of the invention can be, for example, a system for displaying and/or processing medical data, in particular medical imaging data, as implemented by the Siemens company with the syngo.NET system, for example. However, it is understood that at least one embodiment of the invention can also be applied to other medical systems. The terminology which derives partially from the syngo.NET design is therefore understood to be merely exemplary.

In a further aspect of at least one embodiment of the present invention, the latter can be defined as a mechanism for central (running within a process but interworking between a plurality of machines) control of semantic-free aspects (e.g. resource management, lock management, runtime management, application flow management, application load distribution management, etc.) of applications, e.g. medical applications. This has the benefit of simple monitoring, since all these tasks run centrally within a so-called in-process mechanism and therefore the overall collaboration of these mechanisms also becomes easily possible. The semantic-free aspects are therefore removed from the individual applications.

As a result of this, the control of these aspects is simplified and transferred from the individual applications to a central point. In this way, the individual applications become considerably easier to maintain and less susceptible to error. Conversely, these central semantic-free aspects will be implemented in an error-free manner at some time and will therefore be easier to use than if they were embedded in each individual application with its semantic parts. This mechanism applies to further embodiments. The central mechanism therefore provides a central service interface relative to the applications.

The mechanism is preferably intended for application resource management, wherein a plurality of different instances of a specific application are to run concurrently.

The mechanism according to at least one embodiment of the invention is preferably intended for application startup/shutdown/suspend/resume/stop management, i.e. runtime management and monitoring of an application on a machine.

In addition, the mechanism can be intended for load distribution management, i.e. on which machine from a pool of identical machines a specific instance of an application is started up and monitored, in order that the application does not have to share resources of a machine with too many other applications.

The mechanism according to at least one embodiment of the invention is preferably intended for lock management, i.e. on which resources from a pool of resources a specific instance of an application can demand an exclusive access right, in order that the application does not have to share this resource with other applications.

In a further example embodiment, the mechanism is intended for application flow management, i.e. how a set of applications can be connected together in order cooperatively to obtain a meaningful medical result automatically or semi-automatically (by involving the user). The rules for this must generally be defined such that they are application-independent.

In addition, the mechanism is preferably intended for application job queue management.

BRIEF DESCRIPTION OF THE DRAWINGS

In the following detailed figure-based description, example embodiments which are not intended to be restrictive, relating to its features and further advantages, are discussed with reference to the drawings, in which:

FIG. 1 shows a schematic example of the implementation of the claimed strategy management component in the context of a complete application system

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

According to an example embodiment of the invention, component management and control management and even lock management and resource management of an application system are to be combined in a central strategy management component which is shown by way of example in FIG. 1. In 1, FIG. 1 shows various business program components 2 which are designated as tasks and are connected together to form a taskflow in order to implement a specific functionality of the application system. A series of services 4, which the program objects 2 would have accessed directly in the prior art but which are now addressed via the job management of the strategy manager 5, are represented in 3.

The box 5 shows a basic layout of the claimed strategy manager including the various administration functions it implements, such as e.g. a taskflow manager 6, a business manager 7, a job manager 8 with queues 9, 10, a resource manager 11 and a component manager 12. All components of the taskflow manager 5 are located in a single executable which can be loaded into a specific container environment in the case of syngo.NET, for example. The central strategy manager could even operate an external taskflow management framework.

In such a configuration, the requirement for activities or tasks of jobs (which differ from a task in the prior art in that they also have a queue) would be eliminated, wherein both tasks and jobs would evolve to form a so-called service in the more universal sense. The clear distinction between task and job, which must also be taken into consideration in terms of programming, would be superseded as a result of using a strategy manager. Consequently, an advantage of an example embodiment of the invention is that a central management component, this being performed as a single executable, is realized as "container ware" which includes strategies that carry out different container services, said container services being able to control remote services (tasks or jobs) via service agents which likewise run as local container services.

The task=job paradigm implies that a job has the same internal structure as a task. Thus, a job is created when a business form is established, the business form in turn establishing a set of business components that is required in order to perform the work of the job in accordance with the semantic domain of the job (CAD, film, archiving, network, etc.).

The advantage derived from an example embodiment of the invention resides inter alia in that relevant software, which is based on centralized strategy management, is suitable for both the desktop and for web use. Moreover, a central strategy management component allows suspensions in the taskflow and possibly resumption at a subsequent definable time point.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks™, cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A semantic-free and central strategy mechanism for managing concurrently running medical imaging applications of a system including software code stored on a non-transitory computer readable medium and being executed by a processor, the central strategy mechanism comprising:

at least one business program component stored on the non-transitory computer readable medium and being concurrently executed by the processor; and a strategy management component which, as a single executable program object stored on the non-transitory computer readable medium and being executed by the processor, makes at least two administration functions available to the at least one business program component, program code necessary for implementing the at least two administration functions being realized in the strategy management component in such a way that the at least one business program component need not contain any program code for realizing the at least two administration functions, and the program code in the strategy management component being generically realized such that all business program components concurrently running in the system can use the at least two administration functions, the strategy management component and the at least one business program component each being executed in a different and separate executable, one of the at least two administration functions include application load distribution management, the at least two administration functions are configured to be transferred to the strategy management component.

2. The strategy mechanism as claimed in claim 1, wherein the business program components do not contain any program code which is required for supervision in relation to central service mechanisms.

3. The strategy mechanism as claimed in claim 1, wherein another one of the at least two administration functions are selected from job management, resource management, component management, business task management and taskflow management.

4. The strategy mechanism as claimed in claim 1, wherein another one of the at least two administration function is a job management, wherein a central queue is used for all business program components and the job management is performed by the strategy management component in order to connect at least one back-end processing job to the business program components.

5. The strategy mechanism as claimed in claim 1, wherein another one of the at least two administration function is resource management, intended for centralized resource administration for the business program components.

6. The strategy mechanism as claimed in claim 5, wherein the resource management is intended for limiting the number of concurrently running instances of a business program component to a predetermined value.

7. The strategy mechanism as claimed in claim 1, wherein another one of the at least two administration function is a taskflow management, intended for starting up and shutting down, suspending and resuming taskflows or a number of business program components, and for their runtime monitoring.

8. The strategy mechanism as claimed in claim 1, wherein another one of the at least two administration function is a component management, intended for starting up and shutting down business program components, and for their runtime monitoring.

9. The strategy mechanism as claimed in claim 1, wherein the strategy management component includes a flexible communication layer for the communication between the strategy management component and the business program components.

10. The strategy mechanism as claimed in claim 1, wherein the strategy management component is implemented such that at least one of an error frequency and a lack of errors in the strategy management component is a mathematically demonstrable variable.

11. The strategy mechanism as claimed in claim 2, wherein another one of the at least two administration functions are selected from job management, resource management, business task management and taskflow management.

12. A method for centrally controlling semantic-free administration functions of concurrently running medical imaging applications, the method comprising:

executing the administration functions of the medical imaging applications within a process, at least one interwork being connectable between a plurality of computers using a strategy management component such that concurrently executing administration functions of the medical imaging application operate independently of the at least one interwork and are connectable between a plurality of computers, the strategy management component and the administration functions of the medical imaging applications being executed in a different and separate executable, the administration functions of the medical imaging applications include application load distribution management, the administration functions of the medical imaging applications are configured to be transferred to the strategy management component.

13. The method as claimed in claim 12, wherein the administration functions of medical imaging applications include application resource management, wherein a plurality of different instances of a specific application are to run concurrently.

14. The method as claimed in claim 12, wherein the administration functions of the medical imaging applications include application startup/shutdown/suspend/resume/stop management.

15. The method as claimed in claim 12, wherein the administration functions of the medical imaging application include lock management.

16. The method as claimed in claim 12, wherein the administration functions of the medical imaging applications include application flow management.

17. The method as claimed in claim 12, wherein the administration functions of the medical imaging applications include application job queue management.

18. A non-transitory computer readable medium including program segments for, when executed on a computer device, causing the computer device to implement the method of claim 12.

* * * * *